United States Patent Office 2,861,914
Patented Nov. 25, 1958

2,861,914
NEW HALOGEN AND PHOSPHOR CONTAINING COMPOUNDS AND METHOD FOR THEIR USE

Richard Sallmann, Binningen, Switzerland, assignor to Ciba Limited, Basel, Switzerland, a Swiss firm No Drawing. Application January 30, 1956
Serial No. 561,979

Claims priority, application Switzerland September 25, 1951

10 Claims. (Cl. 167—30)

The present application is a continuation-in-part of my copending application Serial No. 310,533, filed September 19, 1952 (and abandoned since the filing of the present application).

The present invention relates to new compounds containing halogen and phosphorus which can be used for combating pests and correspond to the general formula

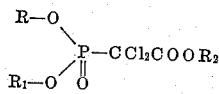
(1)

wherein R and $R_1$ stand for the same or different low molecular aliphatic radicals, and $R_2$ for an aromatic radical.

The possibility must also be considered that the structure is that of an isomeric phosphoric acid ester

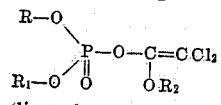
(2)

rather than the indicated structure of phosphonic acid. It has not yet been possible to ascertain which is the correct structure.

The aliphatic radicals R and $R_1$ may be straight-chained or branched, saturated or unsaturated; they may also be substituted or unsubstituted. There may be mentioned the following groups: Methyl, ethyl, propyl, isopropyl, butyl, allyl, 2-chloroethyl radicals; also radicals with thiocyano, cyano or ester groups. The radicals may be alike or different. The aromatic radical $R_2$ may be mono or polynuclear and may carry nuclear substituents; examples are phenyl, 2- or 4-chlorophenyl, 2,4-dimethylphenyl, 4-methoxyphenyl, 4-nitrophenyl, naphthyl or 4-diphenyl radicals.

The new compounds can be obtained by reacting a compound of the general formula

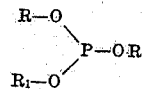

in which R and $R_1$ have the aforementioned significance with a trichloroacetic acid aryl ester.

When the reaction is exothermic, which is often the case, it may be necessary to cool externally and to use inert solvents, such as benzene, toluene, ether, dioxane, hexane or low-boiling benzine as diluents. The reaction is advantageously completed by heating to about 50–120° C. When the reaction participants are suitably selected, the condensation products can be distilled under reduced pressure.

As aforesaid, the new compounds have valuable pest combating properties. Accordingly, the invention also comprises a process for combating pests with the use of compounds of the present invention.

In combating the pests the usual methods are followed. These consist, for example, in treating the objects to be protected with the new compounds in the form of dusting or spraying agents, e. g. as solutions or suspensions prepared with water or suitable organic solvents, such as alcohol, petroleum, tar distillates, etc.; furthermore, aqueous solutions or aqueous emulsions of organic solvents containing the active substances may be used for the brushing, spraying or dipping of the objects to be protected.

The spraying or dusting agents may be admixed with the usual inert fillers or markers, such as, for example, kaolin, gypsum or bentonite or further additives, such as sulfite cellulose waste liquor, cellulose derivatives and the like; also, for improving the wetting capacity and adhesion, the usual wetting agents and adhesives. The pest combating preparations can be made up in the form of powders, aqueous dispersions, or pastes, or as self-dispersing oils.

The new compounds may be the only active ingredient in a pest combating agent or combined with other insecticides and/or fungicides. For plant protection, such preparations may be used by the usual spraying or dusting processes.

As compared to the known pest combating agents in which the radical $R_2$ in the formula first above mentioned stands for an aliphatic radical, the new compounds as a rule present the advantage that in addition to their good effect they are of lower toxicity to warm-blooded animals.

The following examples illustrate the invention, the parts being by weight unless otherwise stated, and the relationship of parts by weight to parts by volume being the same as that of the kilogram to the liter.

Example 1

13.6 parts of trichloracetic acid-para-chlorophenol ester are added to a solution of 6.6 parts of trimethyl phosphite in 10 parts by volume of benzene. The mixture is heated to about 60° C. at which temperature the reaction sets in and gas evolves. When the evolution of gas diminishes and the temperature begins to fall, the reaction mass is heated on the steam bath with reflux cooling for 20 minutes, after which time the reaction is complete. The benzene is distilled off under vacuum, and 17.3 parts of the reaction product of the formula

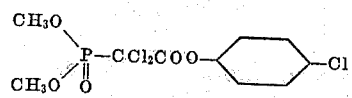

obtained. The product distills at 130–135° C. under a pressure of 0.05 mm. It is a colorless liquid which is insoluble in water and soluble in organic solvents.

Example 2

In the manner described in Example 1, the following compounds can also be obtained:

| Formula | Boiling Point |
|---|---|
| $(C_2H_5O)_2P(O)CCl_2COO-\langle\phantom{xx}\rangle$ | 0.02 mm., 127–128°. |
| $(CH_3O)_2P(O)CCl_2COO-\langle\phantom{xx}\rangle$ | 0.04 mm., 125–127°. |
| $(C_2H_5O)_2P(O)CCl_2COO-\langle\phantom{xx}\rangle-Cl$ | 0.04 mm., 135–140°. |
| $(C_2H_5O)_2P(O)CCl_2COO-\langle\phantom{xx}\rangle-Cl$ | |

| Formula | Boiling Point |
|---|---|
| (CH₃O)₂P(O)CCl₂COO-C₆H₄-Cl | |
| (C₂H₅O)₂P(O)CCl₂COO-C₆H₄-Cl | 0.04 mm., 138–142°. |
| (CH₃O)₂P(O)CCl₂COO-C₆H₄-Cl | 0.03 mm., 115–125°. |
| (C₂H₅O)₂P(O)CCl₂COO-C₆H₄-CH₃ | |
| (CH₃O)₂P(O)CCl₂COO-C₆H₄-CH₃ | 0.05 mm., 127–129°. |
| (C₂H₅O)₂P(O)CCl₂COO-C₆H₃(Cl)(CH₃) | 0.05 mm., 140–145°. |
| (CH₃O)₂P(O)CCl₂COO-C₆H₃(Cl)(CH₃) | 0.1 mm., 155–156°. |
| (C₂H₅O)₂P(O)CCl₂COO-C₆H₄-NO₂ | |
| (CH₃O)₂P(O)CCl₂COO-C₆H₄-NO₂ | |
| (C₂H₅O)₂P(O)CCl₂COO-C₆H₄-C₅H₁₁ | 0.03 mm., 155–160°. |
| (CH₃O)₂P(O)CCl₂COO-C₆H₄-C₅H₁₁ | 0.03 mm., 153–155°. |
| (C₂H₅O)₂P(O)CCl₂COO-C₆H₄-OCH₃ | 0.04 mm., 154–155°. |
| (CH₃O)₂P(O)CCl₂COO-C₆H₄-OCH₃ | |
| (C₂H₅O)₂P(O)CCl₂COO-C₆H₄-C₆H₅ | |
| (CH₃O)₂P(O)CCl₂COO-C₆H₄-C₆H₅ | |
| (C₂H₅O)₂P(O)CCl₂COO-(naphthyl) | 0.04 mm., 163–168°. |
| (CH₃O)₂P(O)CCl₂COO-(naphthyl) | 0.07 mm., 150–165°. |
| (C₂H₅O)₂P(O)CCl₂COO-(naphthyl) | 0.03 mm., 165–175°. |
| (CH₃O)₂P(O)CCl₂COO-(naphthyl) | |
| (C₂H₅O)₂P(O)CCl₂COO-C₆H₄-CH₃ | 0.04 mm., 140–141°. |
| (CH₃O)₂P(O)CCl₂COO-C₆H₄-CH₃ | 0.2 mm., 120–130°. |
| (C₂H₅O)₂P(O)CCl₂COO-C₆H₄-CH₃ | 0.04 mm., 140–142°. |
| (CH₃O)₂P(O)CCl₂COO-C₆H₄-CH₃ | 0.06 mm., 135–137°. |
| (C₂H₅O)₂P(O)CCl₂COO-C₆H₄-CH₃ | 0.04 mm., 127–133°. |
| (CH₃O)₂P(O)CCl₂COO-C₆H₄-CH₃ | 0.04 mm., 125–127°. |
| (C₂H₅O)₂P(O)CCl₂COO-C₆H₃(CH₃)₂ | 0.06 mm., 136–140°. |
| (CH₃O)₂P(O)CCl₂COO-C₆H₃(CH₃)₂ | 0.04 mm., 130–134°. |

While the formulae of the present example and that of Example 1 are set forth in the style of Formula 1 supra, it may be that the structures are those of the isomeric Formula 2 supra.

Example 3

5 parts of the compound obtainable according to Example 1, 10 parts of octylphenolpolyglycol ether, 5 parts of oleic acid and 80 parts of mineral oil are mixed together. There is obtained a self-dispersing oil which is excellently suited as dormant spray. Using a 1% spraying liquid on fruit trees just before bud burst in spring kills the overwintering stages of fruit pests, such as winter eggs of aphids, eggs of winer moths or psyllae and also the overwintering cochineals.

By the application of the aforementioned dormant spray the following insects can be combated:

*Anthonomus pomorum*—Apple-blossom weevil
Aphidinae—Aphids
*Argyresthia ephippella*—Cherry-blossom moth
*Quadraspidiotus ostreaeformis*—European fruit scale
*Quadraspidiotus perniciosus*—San José scale
*Eulecanium corni*—European fruit lecanium
*Eriophyes piri*—Pear leaf blister mite
*Eriosoma lanigerum*—Woolly apple aphid
*Hyponomenta malinella et padella*—Ermine moth
*Psylla mali*—Apple sucker
*Tmetocera ocellana*—Bud moth
*Argyroploce variegana*—Bud moth

Example 4

2 parts of the condensation product described in Example 1, 1 part of the condensation product from 1 mol dodecyl mercaptan and 10 mols of ethylene oxide, and 7 parts of isopropanol are mixed together.

The resulting preparation can be used, for example, for the destruction of aphids. By spraying fruit trees, asters, beans or sunflowers with a spraying liquor containing 0.1 percent of the active substance these plants can be freed from aphids.

For the preparation of spray concentrates other emulsifying agents also may be used. There come into consideration ion-free emulsifying agents, e. g. condensation products from aliphatic alcohols or amines or carboxylic acids which contain a long chain hydrocarbon radical of about 10–30 carbon atoms with ethylene oxide, such as the condensation product from 1 mol of octadecyl-alcohol and 25–30 mols of ethylene oxide, the condensation product from 1 mol of soya oil fatty acid and 30 mols of ethylene oxide or that from 1 mol of technical oleylamine and 15 mols of ethylene oxide or that of 1 mol of dodecyl mercaptan and 12 mols of ethylene oxide. Among the anion active emulsifying agents which may be used there are named the sodium salt of lauryl sulfonic acid, the sodium salt of dodecyl benzene sulfonic acid, the sodium or triethanol amine salt of oleic acid or of abietic acid or of mixtures of these acids or the sodium salt of petroleum sulfonic acid.

Furthermore, cation active emulsifying agents may be used, like dodecylpyridinium chloride.

Instead of isopropanol other organic solvents may be used for preparing the spray concentrate, e. g. ethyl alcohol, methanol, butanol, acetone, methyl ethylketone, methyl cyclohexanol, benzene, toluene, kerosene, white spirit come into consideration.

*Example 5*

50 parts of the condensation product described in Example 1 and 50 parts of the sodium salt of a petroleum sulfonic acid are mixed. There is obtained a spray concentrate which may be used for treatments during the summer season.

Instead of the product of Example 1 others as described in Example 2 can be used.

*Example 6*

1 part of the condensation product from triethyl phosphite and trichloracetic acid cresol ester are mixed with 99 parts of talcum. There is obtained a dusting powder which is very active against the house fly, *Musca domestica*. The content of active ingredient may be increased to 10 percent or more, or reduced to 0.1 percent or less.

Instead of talcum other carriers in powder form, e. g. bentonite, kaolin or mixtures thereof can be used.

*Example 7*

2 parts of the condensation product from trimethyl phosphite and trichloracetic acid cresol ester, 80 parts of sulfur, and 18 parts of copper oxy chloride are mixed. This is a dusting powder which acts as insecticide and fungicide.

What is claimed is:
1. A condensation product from a trialkylphosphite, the alkyl radicals of which contain 1 to 4 carbon atoms, with a trichloracetic acid aryl ester, the aryl radical of which is selected from the group consisting of phenyl, chlorophenyl, lower alkylphenyl, nitrophenyl, lower alkoxyphenyl, cyclohexylphenyl, α-naphthyl and β-naphthyl radicals.
2. A condensation product from a trialkylphosphite, the alkyl radicals of which contain 1 to 4 carbon atoms, with a trichloracetic acid ester of phenol.
3. A condensation product from a trialkylphosphite, the alkyl radicals of which contain 1 to 4 carbon atoms, with a trichloracetic acid ester of a chlorophenol.
4. A condensation product from a trialkylphosphite, the alkyl radicals of which contain 1 to 4 carbons, with a trichloracetic acid ester of a lower alkylphenol.
5. A condensation product from a trialkylphosphite, the alkyl radicals of which contain 1 to 4 carbon atoms, with a trichloracetic acid ester of nitrophenol.
6. A condensation product from a trialkylphosphite, the alkyl radicals of which contain 1 to 4 carbon atoms, with a trichloracetic acid ester of a lower alkoxyphenol.
7. A condensation product from a trialkylphosphite, the alkyl radicals of which contain 1 to 4 carbon atoms, with a trichloracetic acid ester of cyclohexylphenyl.
8. The condensation product from trimethylphosphite with trichloracetic acid ester of p-chlor phenol.
9. The condensation product from triethylphosphite with trichloracetic acid ester of cresol.
10. A method for combating pests which comprises treating the objects which are to be protected against the pests with an effective amount of a condensation product from a trialkylphosphite, the alkyl radicals of which contain 1 to 4 carbon atoms, with a trichloracetic acid aryl ester, the aryl radical of which is selected from the group consisting of phenyl, chlorophenyl, lower alkylphenyl, nitrophenyl, lower alkoxyphenyl, cyclohexylphenyl, α-naphthyl and β-naphthyl radicals.

References Cited in the file of this patent
UNITED STATES PATENTS

| 2,478,441 | Wiley | Aug. 9, 1949 |

FOREIGN PATENTS

| 466,680 | Canada | July 18, 1950 |
| 304,272 | Switzerland | Dec. 31, 1954 |
| 723,633 | Great Britain | Feb. 9, 1955 |
| 310,406 | Switzerland | Oct. 15, 1955 |
| 310,408 | Switzerland | Oct. 15, 1955 |
| 310,410 | Switzerland | Oct. 15, 1955 |
| 310,412 | Switzerland | Oct. 15, 1955 |